US009475416B2

(12) United States Patent
DeForest (10) Patent No.: US 9,475,416 B2
(45) Date of Patent: Oct. 25, 2016

(54) LOCKOUT MECHANISM FOR FOLDABLE HEAD REST

(75) Inventor: Jason DeForest, Commerce, MI (US)

(73) Assignee: Kongsberg Automotive, Inc., Novi, MI (US)

( * ) Notice: Subject to any disclaimer, the term of this patent is extended or adjusted under 35 U.S.C. 154(b) by 205 days.

(21) Appl. No.: 14/362,253

(22) PCT Filed: Dec. 2, 2011

(86) PCT No.: PCT/US2011/063093

§ 371 (c)(1),
(2), (4) Date: Jun. 2, 2014

(87) PCT Pub. No.: WO2013/081630

PCT Pub. Date: Jun. 6, 2013

(65) Prior Publication Data

US 2014/0333098 A1    Nov. 13, 2014

(51) Int. Cl.
| | | |
|---|---|---|
| B60N 2/48 | (2006.01) | |
| B60N 2/00 | (2006.01) | |
| B60N 2/20 | (2006.01) | |
| B60N 2/44 | (2006.01) | |

(52) U.S. Cl.
CPC ............... B60N 2/487 (2013.01); B60N 2/002 (2013.01); B60N 2/206 (2013.01); B60N 2/442 (2013.01); B60N 2/4858 (2013.01); B60N 2002/4455 (2013.01); B60N 2002/4888 (2013.01)

(58) Field of Classification Search
CPC ..................................................... B60N 2/487
USPC ................................ 297/61, 378.12, 378.14
See application file for complete search history.

(56) References Cited

U.S. PATENT DOCUMENTS

| | | | |
|---|---|---|---|
| 4,935,680 | A | 6/1990 | Sugiyama |
| 4,977,973 | A | 12/1990 | Takizawa |
| 5,003,240 | A | 3/1991 | Ikeda |
| 5,006,771 | A | 4/1991 | Ogasawara |
| 5,095,257 | A | 3/1992 | Ikeda et al. |
| 5,105,132 | A | 4/1992 | Sakamoto et al. |

(Continued)

FOREIGN PATENT DOCUMENTS

| | | |
|---|---|---|
| CN | 101314331 A | 12/2008 |
| CN | 201816484 U | 5/2011 |

(Continued)

OTHER PUBLICATIONS

International Search Report and Written Opinion for International Application PCT/US2011/063093 (Aug. 2, 2012).

*Primary Examiner* — David E Allred
(74) *Attorney, Agent, or Firm* — Mintz Levin Cohn Ferris Glovsky and Popeo, P.C.; Steven M. Jensen (57) ABSTRACT

A vehicle seat that is foldable includes a lockout mechanism to prevent movement of a head rest to a folded position if an occupant is present in the vehicle seat. In response to pivoting of a back rest relative to a bottom seat cushion, the head rest normally moves to the folded position, except if the occupant is present. A sensor determines whether the occupant is present, and if the occupant is present, prevents actuation of the head rest. The lockout mechanism can incorporate a lockout pin that is spring biased to fit within a recess of a plunger, such that when the lockout pin is engaged in the recess of the plunger, the head rest is permitted to move to the folded position.

16 Claims, 10 Drawing Sheets

(56) References Cited

U.S. PATENT DOCUMENTS

| | | | |
|---|---|---|---|
| 6,074,011 A | 6/2000 | Ptak et al. | |
| 6,607,242 B2 | 8/2003 | Estrada et al. | |
| 6,860,564 B2* | 3/2005 | Reed | B60N 2/20 297/378.12 |
| 7,588,115 B2 | 9/2009 | Breed | |
| 8,123,272 B2* | 2/2012 | Ito | B60N 2/22 296/65.03 |
| 8,152,242 B2* | 4/2012 | Yetukuri | B60N 2/4852 297/408 |
| 8,197,001 B2* | 6/2012 | Grable | B60N 2/4858 297/378.1 |
| 8,662,578 B2* | 3/2014 | Szybisty | B60N 2/20 297/378.12 |
| 8,845,026 B2* | 9/2014 | Kobayashi | B60N 2/3013 296/65.09 |
| 8,864,209 B2* | 10/2014 | White | B60N 2/065 296/65.01 |
| 2003/0090133 A1* | 5/2003 | Nathan | B60N 2/002 297/217.3 |
| 2004/0195892 A1* | 10/2004 | Daniels | B60N 2/0232 297/378.1 |
| 2005/0067874 A1 | 3/2005 | Kamrath et al. | |
| 2006/0006720 A1* | 1/2006 | Yamada | B60N 2/22 297/378.12 |
| 2006/0217864 A1* | 9/2006 | Johnson | B60N 2/002 701/45 |
| 2006/0250014 A1 | 11/2006 | Daniels | |
| 2007/0062324 A1* | 3/2007 | Ingraham | B60N 2/3011 74/506 |
| 2007/0114822 A1 | 5/2007 | Yetukuri et al. | |
| 2008/0164731 A1 | 7/2008 | Bostrom et al. | |
| 2008/0296950 A1 | 12/2008 | Wieclawski | |
| 2009/0062989 A1* | 3/2009 | Sakai | B60N 2/002 701/45 |
| 2014/0125355 A1* | 5/2014 | Grant | B64D 11/06 324/629 |

FOREIGN PATENT DOCUMENTS

| | | |
|---|---|---|
| DE | 197 36 034 A1 | 2/1999 |
| DE | 10 2008 007 158 | 7/2008 |
| GB | 2 318 285 A | 4/1998 |
| WO | 2009/073971 | 6/2009 |

* cited by examiner

LOCKOUT MECHANISM FOR FOLDABLE HEAD REST

FIELD OF INVENTION

The subject invention relates to a vehicle seat having a foldable head rest, and more particularly to a lockout mechanism for preventing the head rest from being actuated to a folded position when an occupant is in the vehicle seat.

BACKGROUND OF THE INVENTION

In many vehicles, a vehicle seat provided in a second row of seats (or a third or additional row) can be folded, and possibly stowed in a compartment in the floor of the vehicle. The vehicle seat typically includes a head rest (or head restraint, which is used interchangeably with "head rest" as provided herein). However, a problem arises that an operator must either manually disengage the head rest, or otherwise move the head rest to a folded position when folding the vehicle seat.

To address this problem, it is known to couple the head rest to a fold/stow mechanism of the vehicle seat, such that initiation of a folding/stowing operation of the vehicle seat automatically moves the head rest to the folded position. Conventional fold/stow mechanisms typically are designed such that the operator initiates the folding/stowing operation by tilting a back rest of the vehicle seat toward a bottom seat cushion thereof, where tilting of the back rest results in movement of the head rest toward the folded position, for example, by means of an actuation linkage coupling tilting of the back rest to the fold/stow mechanism of the head rest.

However, an arrangement in which tilting of the back rest of the vehicle seat automatically results in folding/stowing of the head rest is undesirable, at least because during use, the occupant may wish to adjust seat position by tilting the back rest, without causing the seat to be folded. Therefore, if such an adjustment in seat position is made with the occupant in the vehicle seat, it may cause discomfort or a safety hazard, in particular because tilting of the back rest would cause the head rest to move toward the folded position.

It would be desirable to provide an arrangement in which an occupant may adjust a back rest of a vehicle seat without causing folding of the head rest, while automatically allowing tilting of the back rest to cause displacement of the head rest when the occupant is not present in the vehicle seat.

SUMMARY OF THE INVENTION

A vehicle seat is provided in a second, third, or additional row of seats in a motor vehicle, the vehicle seat having a head rest that is movable from an operative position to a folded position in response to pivoting of a back rest relative to a bottom seat cushion of the vehicle seat, and which incorporates a lockout mechanism to prevent movement of the head rest between the operative position and the folded position if an occupant is present in the vehicle seat. In particular, a sensor is operably connected to the vehicle seat, in order to determine whether the occupant is present in the vehicle seat, such that if the occupant is present, the lockout mechanism prevents movement of the head rest between the operative position and the folded position in response to movement of the back rest.

A vehicle seat according to the subject application can include: a bottom seat cushion; a back rest configured to be pivoted relative to the bottom seat cushion; a head rest movable between an operative position and a folded position in response to pivoting of the back rest; a sensor configured to determine whether or not an occupant is present in the vehicle seat; and a lockout mechanism operably connected to the vehicle seat, the lockout mechanism configured to prevent movement of the head rest between the operative position and the folded position if the sensor indicates that the occupant is present in the vehicle seat.

The lockout mechanism can include: a housing with a first space and a second space; a plunger slidably disposed in the first space, the plunger being operably connected to a cable that transfers movement from the back rest to the head rest; and a lockout pin movably disposed in the second space, the lockout pin being movable in response to input from a sensor indicating whether or not an occupant is present in the vehicle seat.

A method for preventing movement of a head rest to a folded position when an occupant is present in a vehicle seat, according to the subject invention, can include steps of: providing the vehicle seat including a bottom seat cushion, a back rest configured to be pivoted relative to the bottom seat cushion, and a head rest movable between an operative position and the folded position in response to pivoting of the back rest; receiving a signal from a sensor to determine whether or not the occupant is present in the vehicle seat; and providing a lockout mechanism such that if the signal indicates that the occupant is present in the vehicle seat, the lockout mechanism prevents movement of the head rest between the operative position and the folded position.

Other aspects and embodiments of the invention are discussed below.

BRIEF DESCRIPTION OF THE DRAWINGS

For a fuller understanding of the nature and desired objects of the subject invention, reference is made to the following detailed description taken in conjunction with the accompanying drawing figures wherein like reference character denote corresponding parts throughout the several views and wherein.

DEFINITIONS

The instant invention is most clearly understood with reference to the following definitions:

As used in the specification and claims, the singular form "a", "an" and "the" include plural references unless the context clearly dictates otherwise.

As used herein, the term "vehicle" refers to any type of vehicle, including but not limited to motor vehicles such as cars, trucks, vans, minivans, sport utility vehicles (SUVs), crossover-type vehicles, and other types of vehicles, and further may encompass non-motor vehicles.

The terms "head rest" and "head restraint" are used interchangeably herein, where a head rest (or head restraint) typically is arranged adjacent to a back rest of a vehicle seat, and can provide comfort and/or safety functions.

DETAILED DESCRIPTION OF THE INVENTION

A vehicle seat is provided in a second, third, or additional row in a motor vehicle, the vehicle seat configured to be folded and/or stowed by pivoting a back rest relative to a bottom seat cushion of the vehicle seat, which pivoting movement causes a head rest of the vehicle seat to move between an operative position and a folded position, and which incorporates a sensor to determine whether an occupant is present in the vehicle seat, and a lockout mechanism that prevents movement of the head rest between the operative position and the folded position if the sensor indicates that the occupant is present in the vehicle seat. Also provided is the lockout mechanism itself, which preferably includes a housing with a first space and a second space, a plunger slidably disposed in the first space and operably connected to a cable that transfers movement from the back rest to the head rest, and a lockout pin movably disposed in the second space and which is movable in response to input from the sensor indicating whether or not the occupant is present in the vehicle seat. Further provided is a method for preventing movement of the head rest to the folded position when the occupant is present in the vehicle seat by use of the lockout mechanism, and where if the lockout mechanism receives a signal from the sensor indicating that the occupant is not present in the vehicle seat, then movement of the back rest does not result in movement of the head rest to the folded position.

Figure 1:
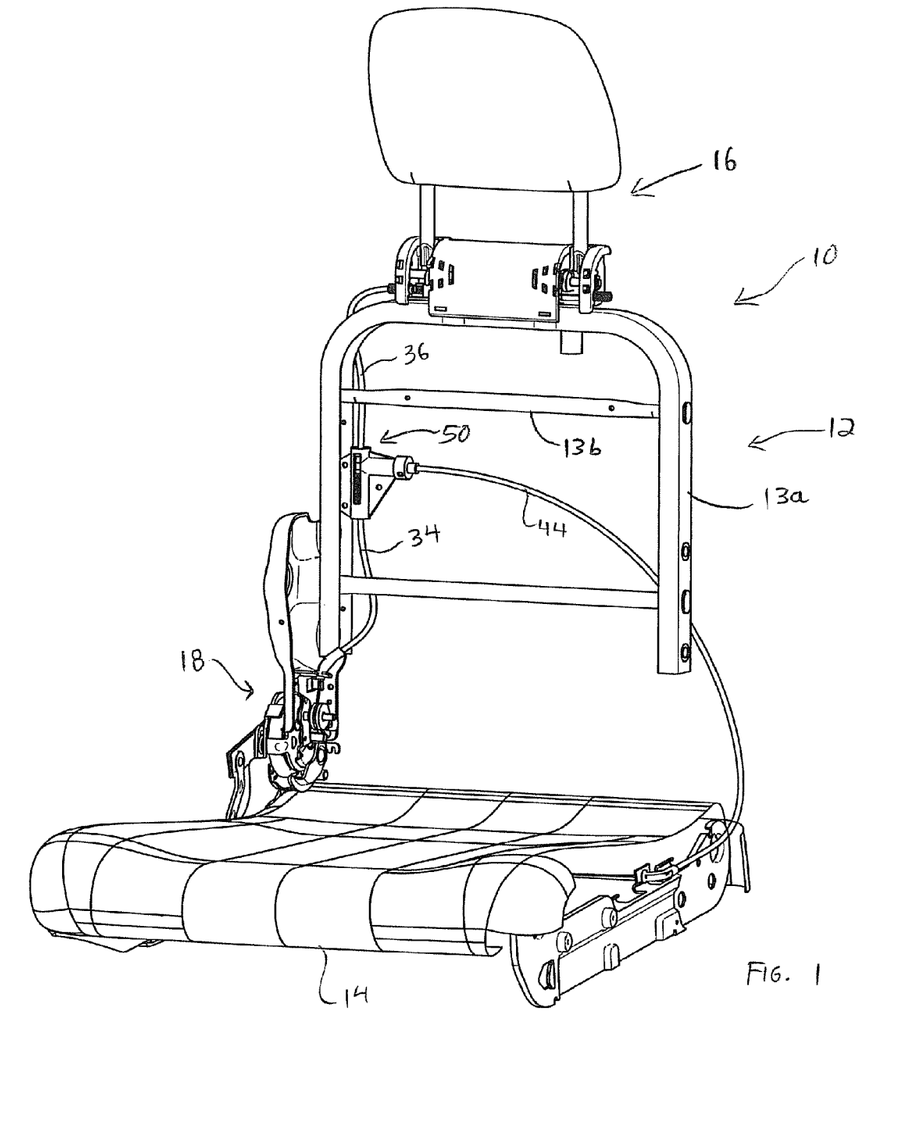
FIG. 1 is a front perspective view of a vehicle seat according to the subject invention.

Referring to FIG. 1, a vehicle seat 10 is depicted, the vehicle seat 10 preferably being provided in a second, third, or additional row of seating in a motor vehicle, and which is configured to be folded and/or stowed in a floor (or another location) in the motor vehicle. The vehicle seat 10 includes at least a back rest 12, a bottom seat cushion 14, and a head rest assembly 16, where certain details of these components have been omitted for convenience. As described below, the head rest assembly 16 can incorporate a head rest (also referred to as a "head restraint").

The back rest 12 includes a frame 13a and at least one cross member 13b, and preferably is connected to the bottom seat cushion 14. A folding mechanism 18 is provided to enable tilting of the back rest 12 relative to the bottom seat cushion 14, the folding mechanism 18 also being used to initiate folding of the vehicle seat 10 in order to fold and/or stow the vehicle seat. Further details of the folding mechanism 18 are discussed below with reference to FIGS. 3-4. The head rest assembly 16 is structurally and operably connected to the back rest 12, as shown in FIGS. 1-2.

Figure 2:
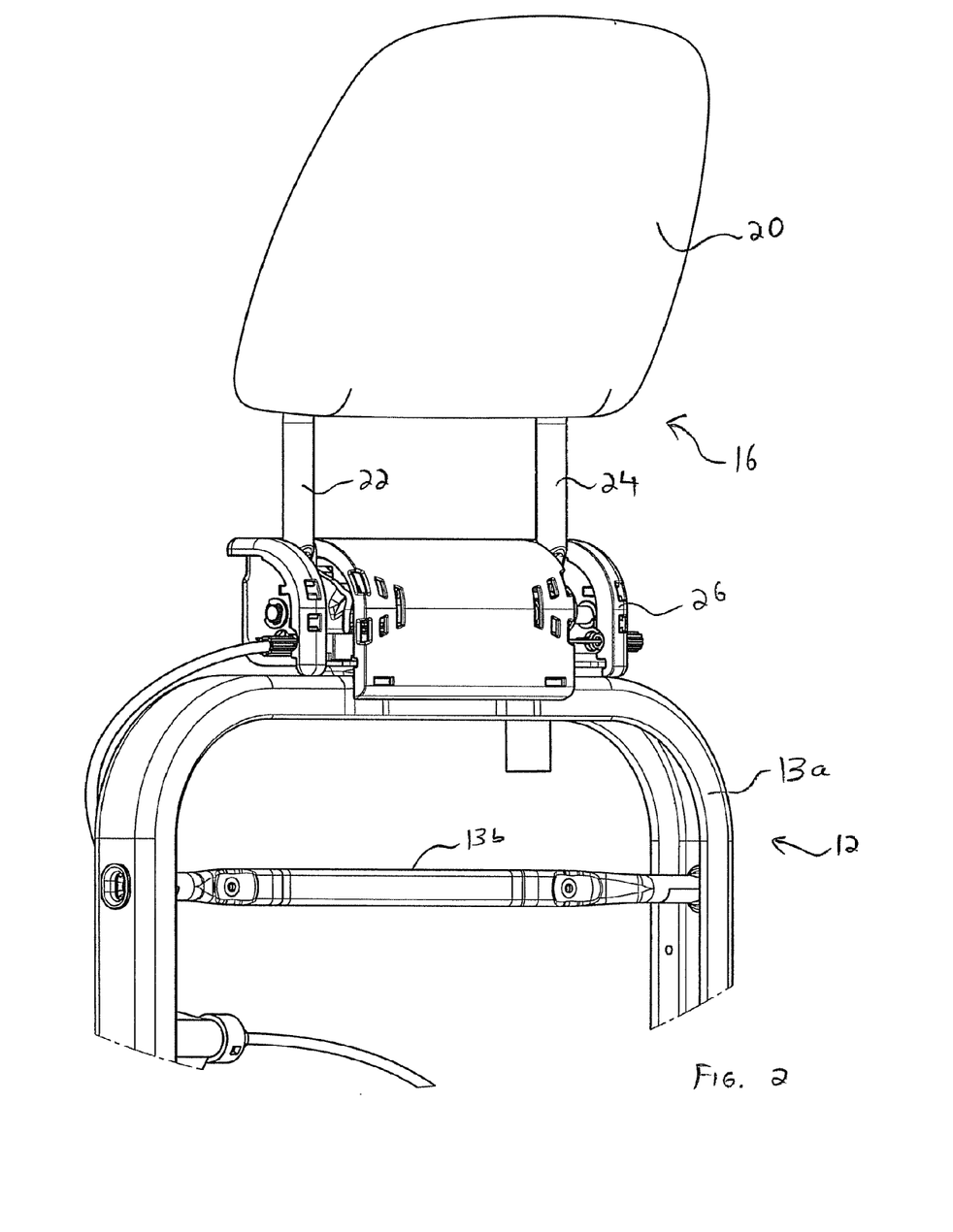
FIG. 2 is an enlarged front perspective view of a head rest connected to the vehicle seat.

As shown in the enlarged view of FIG. 2, the head rest assembly 16 includes a head rest 20 mounted to posts 22 and 24, which are configured to be adjusted within an internal frame 26. In particular, the posts 22 and 24 can be adjusted vertically, and are configured to be folded according to an operation described below. The internal frame 26 of the head rest assembly 16 is connected to the back rest 12.

Figure 3:
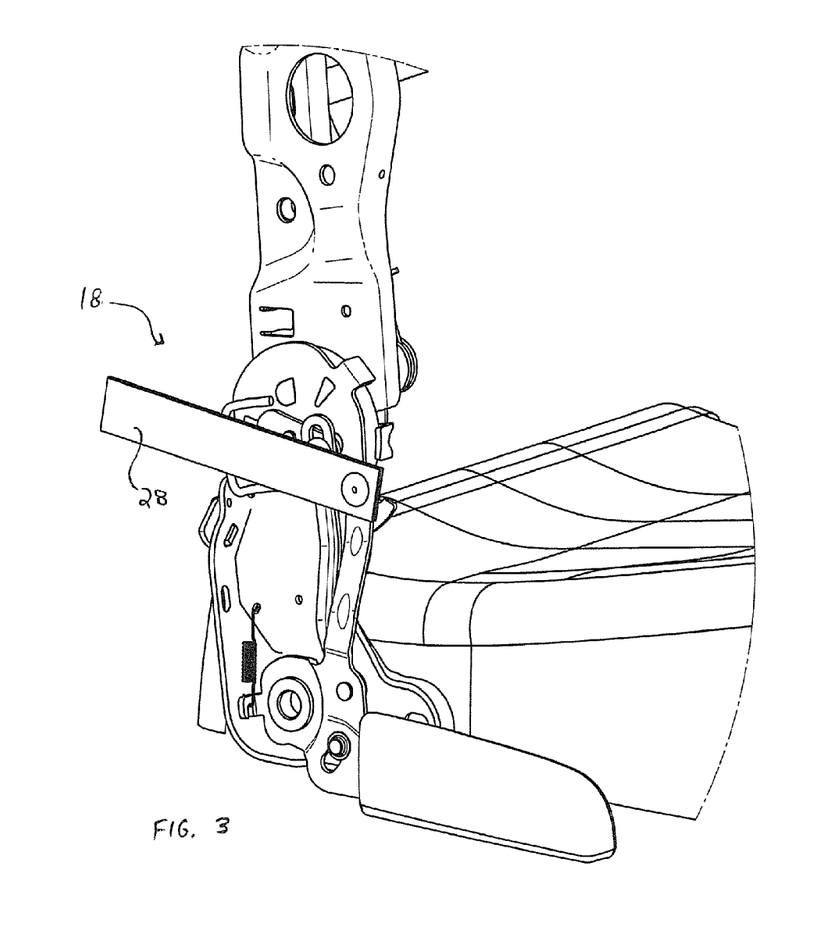
FIG. 3 is a perspective view of a mechanism for tilting a back rest of the vehicle seat, in order to actuate folding of the vehicle seat.
Figure 4:
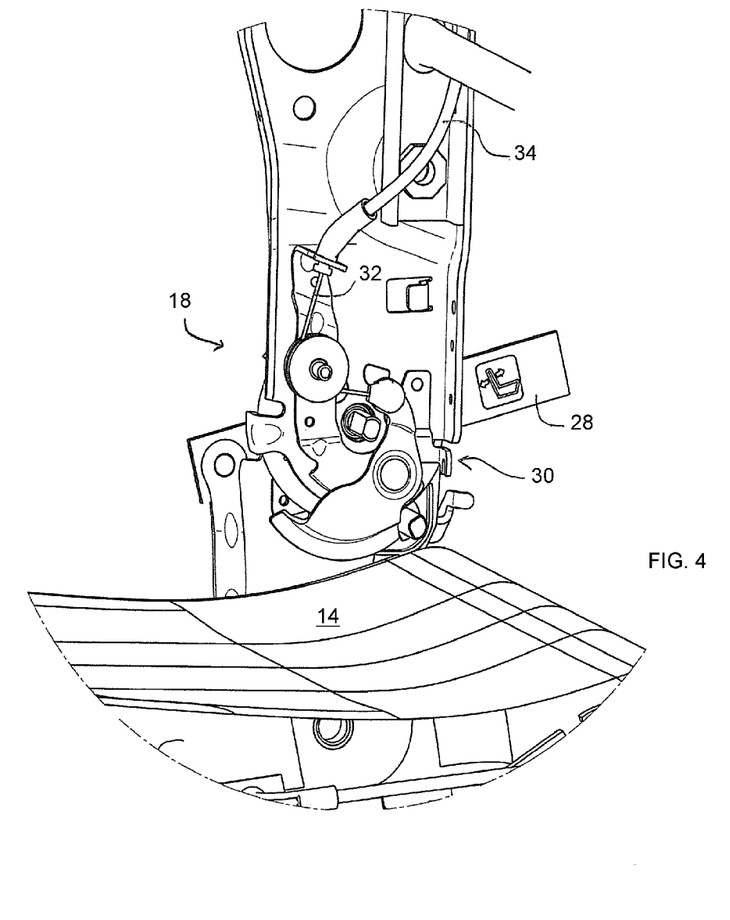
FIG. 4 is an enlarged perspective view of the mechanism for tilting the back rest of the vehicle seat.

Referring to FIGS. 3 and 4, the folding mechanism 18 includes a handle 28 that is manually actuated by an occupant of the vehicle seat, in a known manner, in order enable tilting of the back rest 12 relative to the bottom seat cushion 14. In particular, by pulling the handle 28, the occupant can make desired adjustments in the position of the back rest 12, in order to tilt the vehicle seat forward or backward. If the vehicle seat is tilted forward without the occupant being present in the vehicle seat, it can trigger movement of the head rest assembly 16 toward a folded position, as described in greater detail below, in order to fold the vehicle seat. As shown in FIGS. 3-4, the handle 28 is operably connected to a pulley 30 connected to a cable 32 that transfers movement of the back rest 12 to the head rest assembly 16, as described herein. The cable 32 preferably is received within a conduit 34, the conduit 34 having a first end connected to the pulley 30 and a second end connected to the lockout mechanism, as described below.

Figure 5:
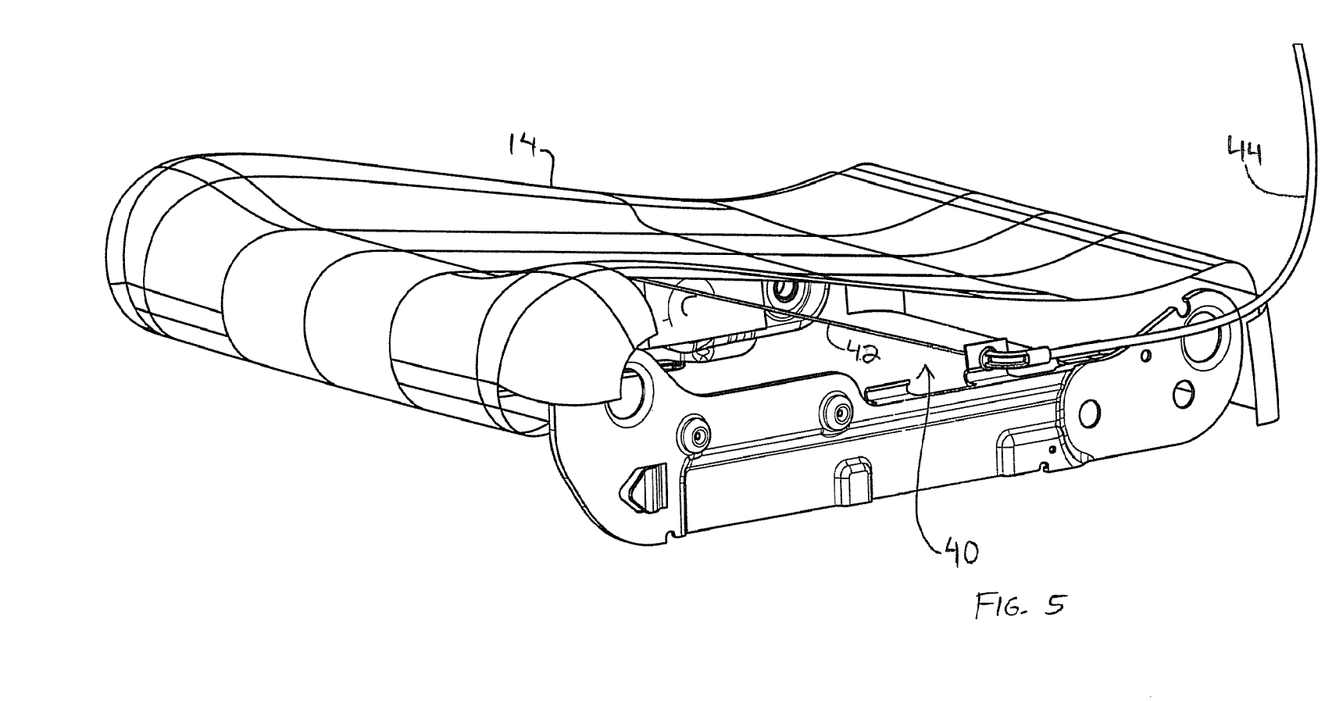
FIG. 5 is a side perspective view of a bottom seat cushion of the vehicle seat incorporating an occupant sensor.

FIG. 5 depicts the bottom seat cushion 14 having a sensor 40 including a seat cushion input cable 42 received in a seat cushion input conduit 44, the sensor 40 signaling to the lockout mechanism whether or not an occupant is present in the vehicle seat. In particular, the seat cushion input cable 42 (of the sensor 40) has a first end connected to the vehicle seat, and a second end connected to a lockout mechanism (specifically, a lockout pin 74, as described later). The conduit 44 has a first end connected to the sensor 40 and a second end connected to a housing 52, as described below.

As depicted in FIG. 5, the sensor 40 preferably is a mechanical sensor in which the occupant, if present in the vehicle seat, produces a downward force against the bottom seat cushion 14 due to the occupant's weight, which causes the seat cushion input cable 42 of the sensor 40 to be pulled in a direction away from the lockout mechanism, thereby resulting in retraction of the lockout pin 74 and preventing actuation of the head rest assembly 16 to a folded position, as described below. The sensor 40 is exemplary of a mechanical or electro-mechanical sensor that can be used to sense whether the occupant is present in vehicle seat, but various alternatives may be used. For example, the sensor 40 can be replaced by a switching arrangement in which a switch is opened or closed in an electronic circuit in response to the occupant's weight, the switch being operably connected to the lockout mechanism. Other suitable sensors include electronic sensors that communicate an electrical signal to the lockout mechanism, and in which a controller preferably includes programmable logic for controlling folding of the head rest.

Figure 6:
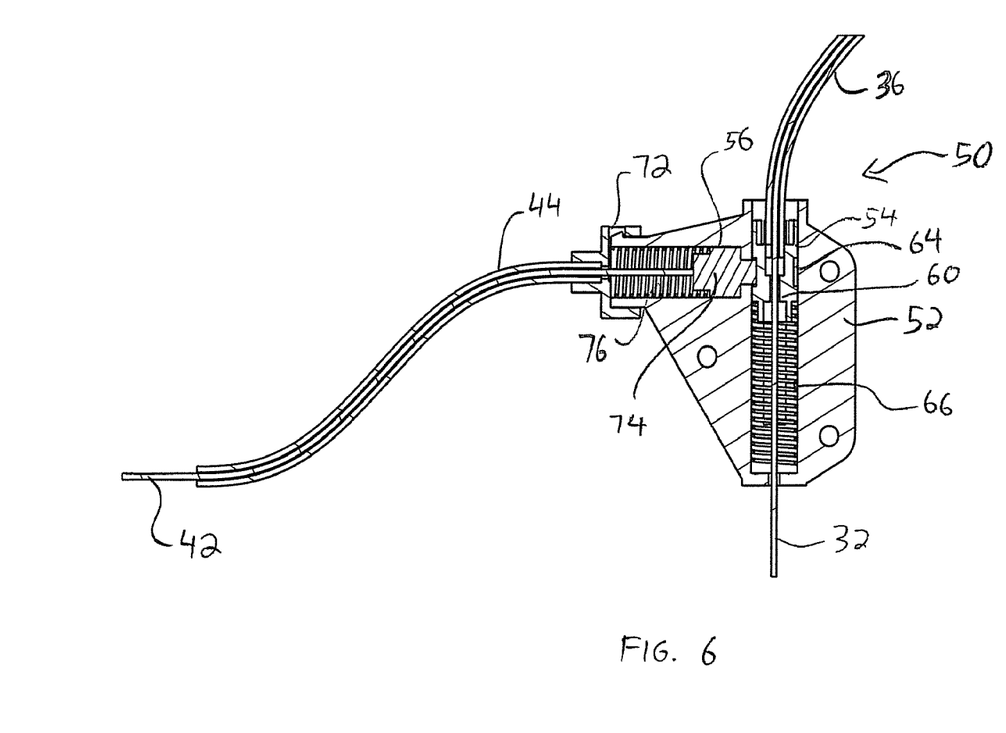
FIG. 6 is a cross-sectional view of a lockout mechanism of the vehicle seat.
Figures 7A, 7B:
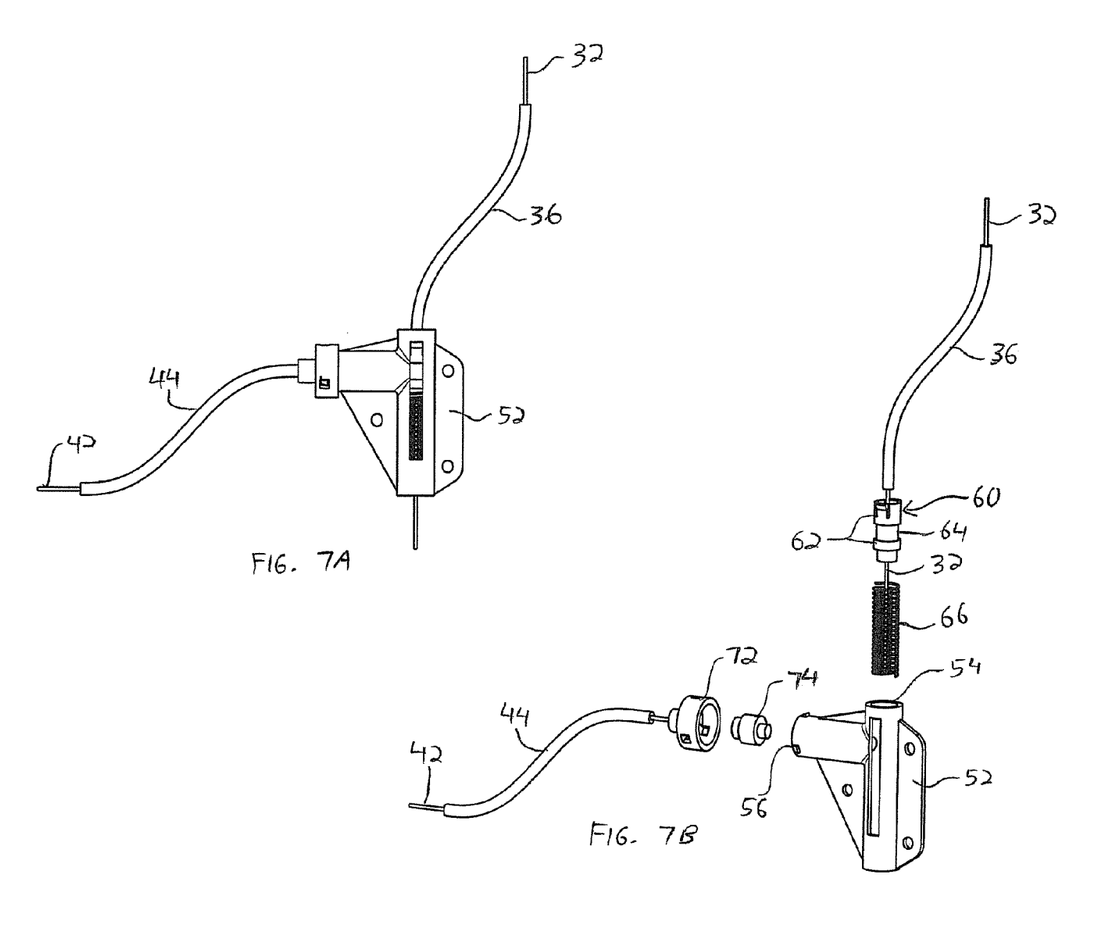
FIGS. 7A-7B are a side view and an exploded parts view, respectively, of the lockout mechanism of FIG. 6.

A lockout mechanism 50 according to the subject invention is depicted in FIGS. 6 and 7A-7B. The lockout mechanism 50 is operably connected to at least the following inputs: (1) the cable 32 that transfers movement of the back rest 12 to the head rest assembly 16 (where the cable 32 is shown without the conduit 34 in FIG. 6 for convenience); and (2) the seat cushion input cable 42 contained in the seat cushion input conduit 44 that transfers a signal of the sensor 40 indicating whether or not an occupant is present in the vehicle seat (i.e., the bottom seat cushion 14). The lockout mechanism 50 has an output of the cable 32, which transfers movement of the back rest 12 to the head rest assembly 16. In other words, the cable 32 preferably passes directly through the lockout mechanism 50, and thus serves as both an input and an output to the lockout mechanism. Alternatively, it is possible to replace the cable 32 with two separate cables, i.e., one cable being connected to the back rest 12, and another cable being connected to the head rest assembly 16, where in such an embodiment, the cables may be interconnected within the lockout mechanism.

The lockout mechanism 50 according to the subject invention preferably includes a housing 52 with a first space 54 and a second space 56, the first space 54 receiving the cable 32, and the second space 56 receiving the seat cushion input cable 42. The first and second spaces 54, 56 are arranged so as to intersect, and may be provided at a suitable angle, such as 90°, relative to each other. Preferably the first and second spaces 54, 56 are arranged in a perpendicular manner, as shown in FIGS. 6 and 7A-7B.

Referring to FIGS. 6 and 7A-7B, a plunger 60 is attached to a head rest conduit 36, which has a first end connected to the plunger 60, and a second end connected to the head rest assembly 16 (see FIG. 1). The head rest conduit 36 receives the cable 32 for transferring movement of the back rest 12 to the head rest assembly 16 in the operative position of the head rest assembly 16.

The plunger 60 is configured to be received within the first space 54 of the housing 52. In particular, the plunger 60 has an outside diameter 62 that is smaller than a diameter of the first space 54 such that the plunger 60 is slidable in the first space 54. A compression spring 66 is connected to one end of the plunger 60 so as to bias the plunger 60 in the direction of the head rest assembly 16. The plunger 60 preferably includes a recess 64 having a smaller diameter than the outside diameter 62 of the plunger 60, the recess 64 configured to be engaged by a lockout pin, as described below.

In the second space 56 of the housing 52, the seat cushion input cable 42 is received, so as to transfer a signal from the sensor 40 arranged with respect to the bottom seat cushion 14, and thus indicate whether or not an occupant is present in the vehicle seat. To facilitate connection of the seat cushion input cable 42 to the second space 56, the seat cushion input conduit 44 that surrounds the seat cushion input cable 42 is connected to the housing 52 by a collar 72. A lockout pin 74 preferably is spring biased away from the collar 72 and toward the intersection with the first space 54 by a compression spring 76. In particular, the lockout pin 74 is configured to engage the recess 64 of the plunger 60, allowing actuation of the head rest 20, known as an "operative position" of the head rest assembly 16. In the operative position, the head rest 20 is configured to be folded in response to actuation of the back rest 12, when there is no occupant in the vehicle seat. When the lockout pin 74 is disengaged from the plunger 60, the cable 32 does not move through the conduit 36, but instead the plunger 60 will move within the housing 52.

In operation, the lockout mechanism 50 functions as follows. As described above, the lockout pin 74 is spring biased toward the recess 64 of the plunger 60, which corresponds to the operative position of the head rest assembly 16 (see FIG. 6). When the lockout pin 74 is engaged with the recess 64 of the plunger 60 and no occupant is present in the vehicle seat, then movement of the back rest 12 is transferred to the head rest assembly 16 via the cable 32, and the head rest 20 can be moved to a folded position.

When an occupant is present in the vehicle seat, the occupant exerts a downward force on the bottom seat cushion 14, which causes the sensor 40 to send a signal via the seat cushion input cable 42 (in this case, there is a mechanical pull on the lockout pin 74). The signal is transmitted via the seat cushion input cable 42, which results in a pull of the seat cushion input cable 42 of sufficient force to overcome the bias of the compression spring 76, thereby pulling the lockout pin 74 out of engagement with the recess 64 of the plunger 60. As a result, the plunger 60 connected to the conduit 36 is free to move within the first space 54. Consequently, when there is a pull on the cable 32 due to displacement of the back rest 12, instead of causing movement of the head rest assembly 16, it will merely result in displacement of the plunger 60 within the housing 52 (i.e., the conduit 36 is slacked within the housing 52), without causing actuation of the head rest assembly 16. In other words, instead of movement of the back rest 12 being transferred to the head rest assembly 16 via the cable 32, the plunger 60 attached to the conduit 36 surrounding the cable 32 will simply move inside the lockout mechanism 50.

A method for preventing movement of a head rest to a folded position when an occupant is present in a vehicle seat can include steps of: providing the vehicle seat including a bottom seat cushion, a back rest configured to be pivoted relative to the bottom seat cushion, and a head rest movable between an operative position and the folded position in response to pivoting of the back rest; receiving a signal from a sensor to determine whether or not the occupant is present in the vehicle seat; and providing a lockout mechanism such that if the signal indicates that the occupant is present in the vehicle seat, the lockout mechanism prevents movement of the head rest between the operative position and the folded position. Further, if the signal indicates that the occupant is not present in the vehicle seat, the head rest is permitted to move between the operative position and the folded position. Additionally, the lockout mechanism can include a housing with a first space and a second space, the first space receiving a plunger slidably disposed in the first space, and the second space receiving a lockout pin configured to engage the plunger to prevent movement of the head rest in response to movement of the back rest.

Figure 8:
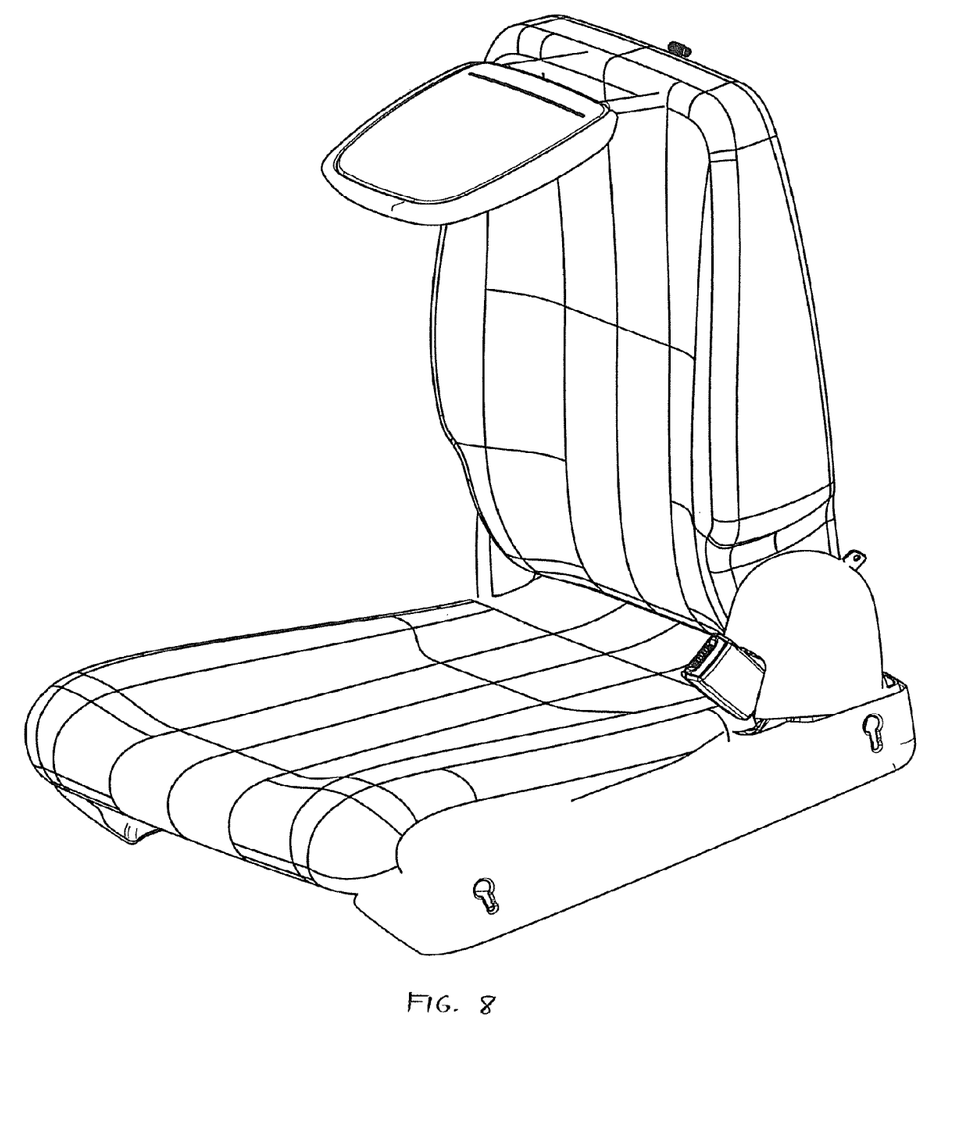
FIG. 8 is a side perspective view of the vehicle seat with the head rest in a first folded position.
Figure 9:
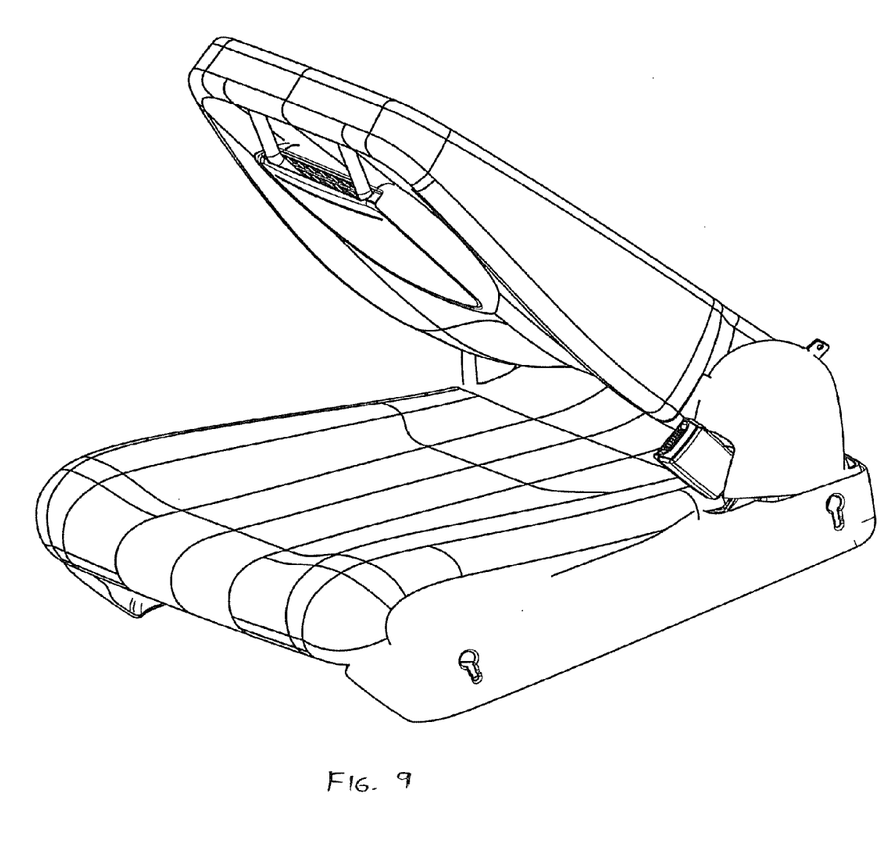
FIG. 9 is a side perspective view of the vehicle seat with the head rest in a second folded position, and the back rest tilted forward.
Figure 10:
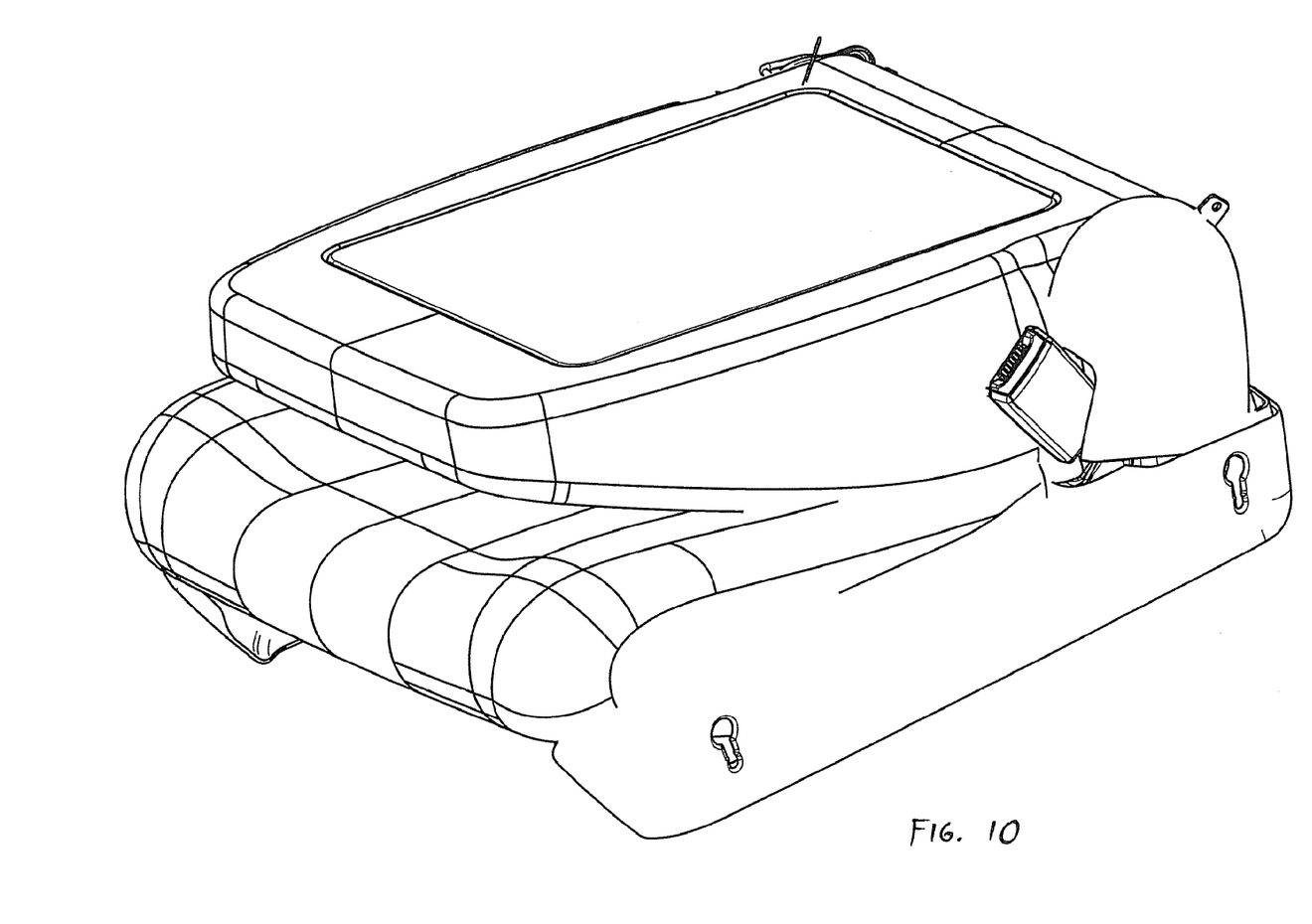
FIG. 10 is a side perspective view of the vehicle seat in a folded position.

FIGS. 8-10 depict three stages of folding of the vehicle seat. In particular, when the sensor 40 indicates that the occupant is not present in the vehicle seat, then the head rest assembly 16 is configured to be folded in response to movement of the back rest 12. In such a case, the head rest assembly 16 is in the operative position, and movement of the back rest 12 causes the head rest 20 of the head rest assembly 16 to move sequentially from a first folded position (see FIG. 8) in which the head rest 20 is approximately perpendicular to the back rest 12 to a second folded position (see FIG. 9) in which the head rest 20 is approximately parallel to the back rest 12, and thus substantially pressed against the back rest 12. Further actuation of the back rest 12 results in folding of the back rest 12 against the bottom seat cushion 14, with the head rest 20 arranged substantially between the back rest 12 and the bottom seat cushion 14 (see FIG. 10). Folding of the back rest 12 and the head rest assembly 16 is not limited to the positions depicted in FIGS. 8-10, which are merely exemplary of a folding operation.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:
1. A vehicle seat, comprising:
a bottom seat cushion;

a back rest configured to be pivoted relative to the bottom seat cushion;

a head rest movable between an operative position and a folded position in response to pivoting of the back rest;

a sensor configured to determine whether or not an occupant is present in the vehicle seat; and a lockout mechanism operably connected to the vehicle seat, the lockout mechanism configured to prevent movement of the head rest between the operative position and the folded position if the sensor indicates that the occupant is present in the vehicle seat, wherein the head rest is connected to the back rest by a cable that transfers movement from the back rest to the head rest, the lockout mechanism comprises a housing with a first space and a second space, the cable and a plunger being received in the first space, and a lockout pin being received in the second space, and the plunger is slidably disposed in the first space, and the lockout pin is movable within the second space.

2. The vehicle seat of claim 1, wherein the lockout pin is configured to engage the plunger if the sensor indicates that the occupant is not present in the vehicle seat.

3. The vehicle seat of claim 2, wherein the sensor is connected to the lockout pin such that if the occupant is present in the vehicle seat, the lockout pin disengages from the plunger, thereby preventing movement of the head rest.

4. The vehicle seat of claim 1, wherein if the sensor indicates that the occupant is not present in the vehicle seat, then the head rest is permitted to move between the operative position and the folded position in response to pivoting of the back rest.

5. The vehicle seat of claim 1, wherein the plunger is formed with a recess, and the lockout pin engages the recess to prevent movement of the plunger.

6. The vehicle seat of claim 5, wherein upon engagement of the lockout pin with the plunger, a position of the conduit is fixed, and the cable is permitted to move through the conduit, thereby allowing actuation of the head rest.

7. The vehicle seat of claim 1, wherein the lockout pin is movable in response to input from the sensor such that if the occupant is present in the vehicle seat, the lockout pin moves out of engagement with the plunger, thereby preventing movement of the head rest to the folded position.

8. The vehicle seat of claim 1, wherein the sensor comprises at least a seat cushion input cable having a first end fixed to the vehicle seat and a second end fixed to the lockout pin such that if the occupant is present in the vehicle seat, the sensor causes the lockout pin to move out of engagement with the plunger, thereby preventing movement of the head rest to the folded position.

9. A lockout mechanism for a vehicle seat having a bottom seat cushion, a back rest configured to be pivoted relative to the bottom seat cushion, and a head rest movable in response to pivoting of the back rest, comprising:

a housing with a first space and a second space;

a plunger slidably disposed in the first space, the plunger being operably connected to a cable that transfers movement from the back rest to the head rest; and a lockout pin movably disposed in the second space, the lockout pin being movable in response to input from a sensor indicating whether or not an occupant is present in the vehicle seat, wherein the sensor is connected to the lockout pin, the lockout pin being movable in response to input from the sensor, such that if the occupant is present in the vehicle seat, the lockout pin moves out of engagement with the plunger, thereby preventing movement of the head rest in response to movement of the back rest.

10. The lockout mechanism of claim 9, wherein upon engagement of the lockout pin with the plunger, the head rest is movable between the operative position and the folded position.

11. The lockout mechanism of claim 9, wherein upon disengagement of the lockout pin from the plunger, the head rest is prevented from moving to a folded position in response to movement of the back rest.

12. The lockout mechanism of claim 9, wherein the plunger is formed with a recess, and the lockout pin engages the recess to prevent movement of the plunger.

13. A method for preventing movement of a head rest to a folded position when an occupant is present in a vehicle seat, comprising the steps of:

providing the vehicle seat including a bottom seat cushion, a back rest configured to be pivoted relative to the bottom seat cushion, and a head rest movable between an operative position and the folded position in response to pivoting of the back rest;

receiving a signal from a sensor to determine whether or not the occupant is present in the vehicle seat; and providing a lockout mechanism such that if the signal indicates that the occupant is present in the vehicle seat, the lockout mechanism prevents movement of the head rest between the operative position and the folded position, wherein the head rest is connected to the back rest by a cable that transfers movement from the back rest to the head rest, the lockout mechanism comprises a housing with a first space and a second space, the cable and a plunger being received in the first space, and a lockout pin being received in the second space, and the plunger is slidably disposed in the first space, and the lockout pin is movable within the second space.

14. The method of claim 13, wherein if the signal indicates that the occupant is not present in the vehicle seat, the head rest is permitted to move between the operative position and the folded position.

15. The method of claim 13, wherein the lockout pin is configured to engage the plunger if the sensor indicates that the occupant is not present in the vehicle seat.

16. The method of claim 13, wherein the sensor is connected to the lockout pin such that if the occupant is present in the vehicle seat, the lockout pin disengages from the plunger, thereby preventing movement of the head rest.

* * * * *